United States Patent [19]
Tuomaala

[11] 3,805,661
[45] Apr. 23, 1974

[54] MECHANISM FOR FASTENING AND PRESTRESSING OF CIRCLE SAW BLADE

[75] Inventor: Jorma Aarne Kullervo Tuomaala, Karhula, Finland

[73] Assignee: A. Ahlstrom Osakeyhtio, Noormarkku, Finland

[22] Filed: Feb. 11, 1972

[21] Appl. No.: 225,568

[30] Foreign Application Priority Data
Feb. 12, 1971 Finland.................................. 409/71

[52] U.S. Cl......................... 83/666, 30/339, 83/698
[51] Int. Cl............................ B27b 5/32, B27b 5/34
[58] Field of Search......... 83/666, 665, 698; 30/339; 51/168; 287/53 R, 52.04 R

[56] References Cited
UNITED STATES PATENTS

| | | | |
|---|---|---|---|
| 2,804,112 | 8/1957 | Schaller | 83/666 X |
| 692,349 | 2/1902 | Reichenbach | 83/666 |
| 301,905 | 7/1884 | Lytle | 83/665 |
| 2,798,748 | 7/1957 | Maurer | 287/52.04 |
| 2,699,338 | 1/1955 | Rue et al. | 287/52 R |
| 3,012,799 | 12/1961 | Mayne | 287/52 R |
| 2,989,327 | 6/1961 | Hermanus | 287/52 R |

*Primary Examiner*—J. M. Meister
*Attorney, Agent, or Firm*—Brooks, Haidt & Haffner

[57] ABSTRACT

In a circle saw one or several saw blades are fastened onto the rotatable saw shaft and prestressed by enlarging the blade hole diameter so that the blade takes a desired slightly conical shape. Enlarging is achieved by using a flexible member inserted between a rotating body which may also be the end of said shaft carrying the blades and the edge of the blade hole, such flexible member being of the type tending to expand radially by axial compression. The mechanism further includes tightening means by which said axial compression is performed and which may suitably be used simultaneously for fastening the blades. Said flexible member may preferably comprise a conical spring plate. Adjustment of the prestressing force may be carried out even during operation by mechanical means or using a pressure medium.

4 Claims, 6 Drawing Figures

MECHANISM FOR FASTENING AND PRESTRESSING OF CIRCLE SAW BLADE

BACKGROUND OF THE INVENTION

1. Field of the Invention

This invention relates to a mechanism for fastening and prestressing of at least one saw blade with a hole in the middle onto the saw shaft of a circle saw of the type, in which the blades are arranged on an axial rotating body and are prestressed by enlarging the hole diameter thereof so that the blades obtain a desired slightly conical form.

2. Description of the Prior Art

In circle saws the saw blade will expand because of the heat during sawing, whereby its rim will expand more than the parts close to the hub, with the result that the blade tends to bend and vibrate. Efforts have been made to prevent this by stretching the saw blade by hammering or rolling. This is very difficult to carry out and demands great skill of work. In regrinding the saw blades their diameter will decrease and the blades have had to be restretched. In order to prevent this difficulty there has been suggested a method that is presented in the Finnish Pat. No. 37,290, and which is characterized in that the saw blades are prestressed by enlarging the diameter of the holes in the blades so that the blades take on a desired conical form.

In said patent publication there is also disclosed a mechanism for performing the method, in which mechanism the shaft of the saw has a hub carrying the saw blades and provided with a chamber, which is filled with fluid under pressure that brings about a radial enlargement of a shell bordering the chamber outwards and thus enlargement of the diameter of the blade holes.

By using the medium under pressure one can easily bring about a very great prestressing power. On the other hand this solution demands special arrangements in that the hub of the circle saw must have a suitably tight connection to the pressure medium source outside the hub. The pressure medium source can be very simple but yet it is always necessary.

By using a pressure medium the change in the diameter of the expanding shell is, however, relatively small, for which reason the holes in the blades must be made with great accuracy. In some cases, for instance, in connection with the most usual one-bladed circle saws, such a mechanism connected with the pressure medium source is too complicated to be used in practice.

The purpose of this invention is to bring about a fastening mechanism for a circle saw blade that meets different demands and conditions, in which the prestressing of the blade is brought about in a simple way either mechanically or, as also in said known solution, by using pressure medium and which mechanism is suitable for use as well in one-bladed as in many-bladed circle saws.

SUMMARY OF THE INVENTION

In accordance with the present invention there is provided a mechanism in a circle saw for fastening on the saw shaft and prestressing of at least one saw blade with a hole in the middle, comprising an axial body rotating with and carrying the blades and having an outer diameter which is essentially smaller than the diameter of the blade hole, a flexible member, located between the rim of said axial body and the edge of the blade hole, said flexible member being radially expanding by compression in axial direction, supporting means supporting the blade from at least one side, and tightening means for compressing the flexible member in axial direction, thereby tending to enlarge the flexible means radially and performing prestressing of the blade. The flexible member may preferably be a conical, ring shaped spring plate. The prestressing force may be adjustable during operation e.g., by a pressure medium operated piston connected to the tightening means or mechanically by a sprocket wheel or similar, the axis of which is connected with threads to the tightening means and the angular position of which may be adjusted in relation to that of the tightening means.

DESCRIPTION OF THE PREFERRED EMBODIMENTS

Figure 1:
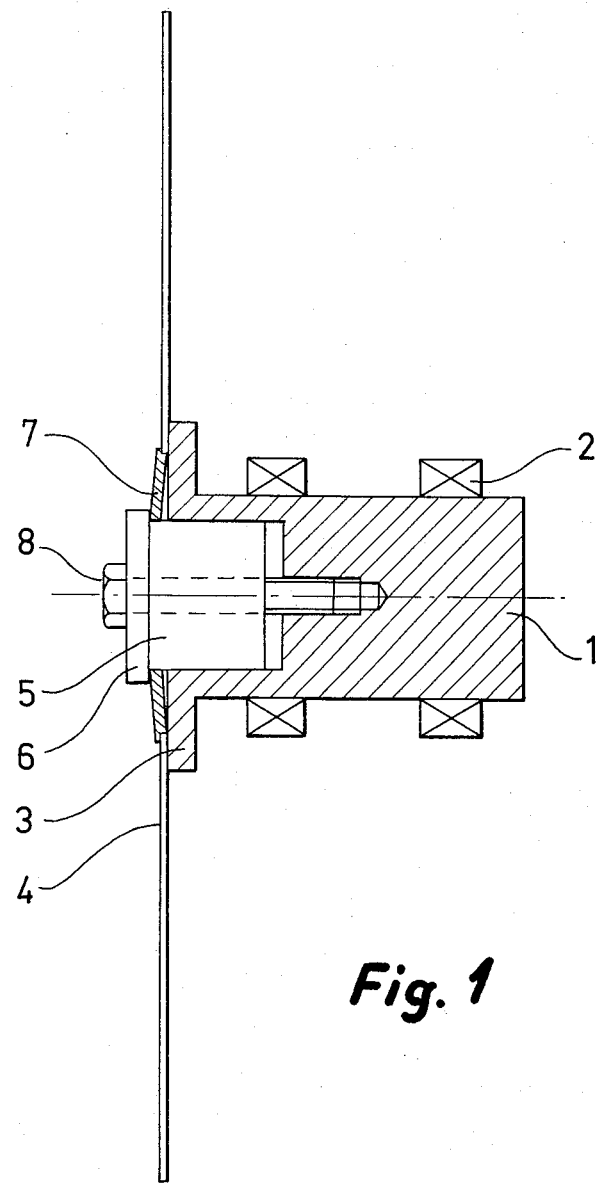
FIG. 1 shows a mechanism according to the invention for fastening and prestressing of the blade in a one-bladed circle saw.

In FIG. 1 the reference number 1 refers to the shaft of the circle saw, which is mounted in bearings 2. At the end of the shaft is an end flange 3, against which the saw blade 4 rests. In the end of the shaft is also lathed a cylindrical guiding surface for a cylindrical body 5 which is inserted into the shaft and is provided with an end flange 6. Between the flanges 3 and 6 is arranged a conical spring plate 7, the inside diameter of which is the same as the outside diameter of the body 5, and the outside of which is the same as the diameter of the hole in the saw blade. By tightening the screw 8 extending through the body 5 the distance between the flanges 3 and 6 gets smaller, and the conicity of the spring plate 7 decreases and its outer diameter tends to enlarge. This causes a power acting radially outwards at the hole of the blade, and the blade will obtain the desired prestressing.

The spring plate 7 may be of so-called Belleville type, which can be bought cheaply as a standard part, but also other kinds of spring plates, where axial compression causes radial expansion could be suitable. To lessen the needed tightening power the conical spring plate may be provided with radial openings, it may even consist of a series of radially sloping rods. As shown in the figure there can be a notch in the edge of the plate rim for the edge of the blade hole.

Figure 2:
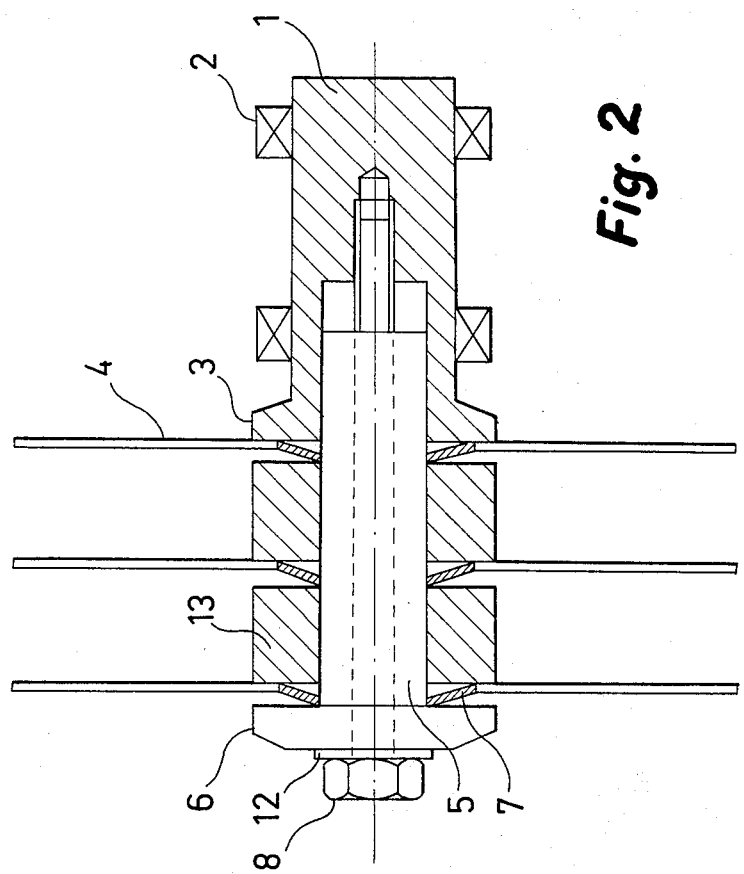
FIG. 2 shows a mechanism of principally the same kind as in FIG. 1 for fastening of several blades.

The mechanism according to FIG. 2, which is provided with three blades 4, is to its principle of structure the same as the one presented in FIG. 1 and the reference numbers 1–8 imply the same as above. In tightening the screw 8 the socket shaped body 5 is moved to the right and the flange part 6 at its end presses directly the outer spring plate 7 inwards and by means of the intermediary rings 13 between the blades 4 correspondingly the other spring plates. In the figure the reference number 12 indicates a base plate for the head of the screw 8.

Figure 3:
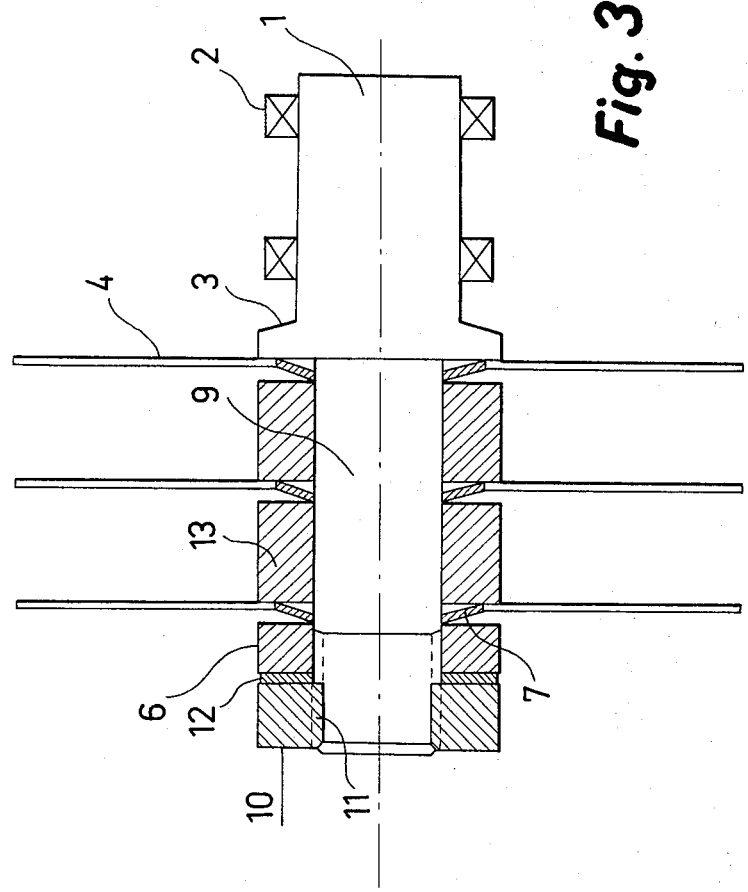
FIG. 3 shows a somewhat different embodiment for fastening several blades.

The mechanism according to FIG. 3, which also has three blades 4, differs from the one above in that the axially rotating body is formed by an extension 9 of the shaft 1, in the end of which is a thread 11. The plate shaped part 6, acting upon the outer spring plate 7 is in this case a ring slidable on the extension 9 in the same way as the intermediary rings 13. For fastening an prestressing of the blades the nut 10 at the threaded end of the extension 9 is tightened and presses by means of its base plate 12 and the rings 6 and 13 all spring plates 7 together in the axial direction.

Figure 4:
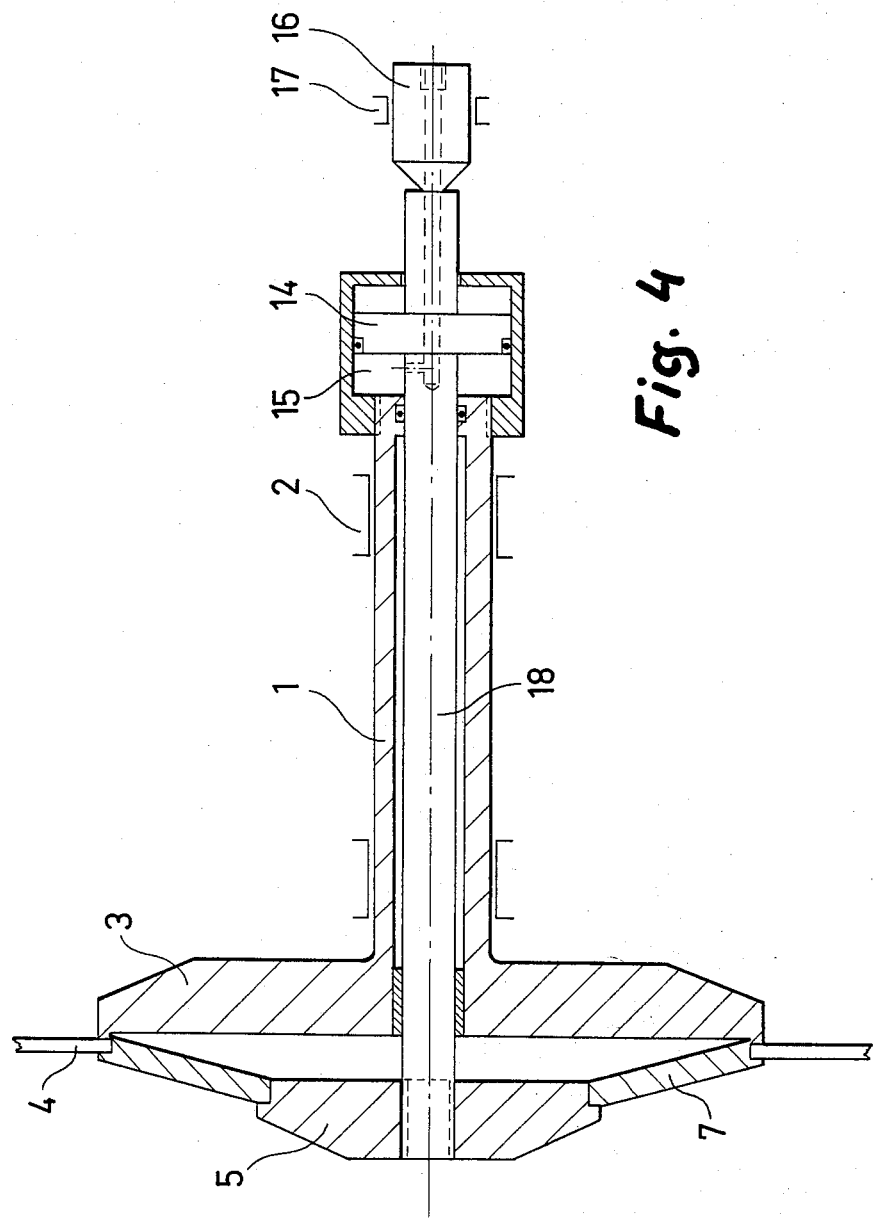
FIG. 4 shows a one-bladed circle saw, where the prestressing of the blade may be hydraulically controlled during operation.

In the embodiment according to FIG. 4, where by prestressing of the blade can be changed during operation, the number 7 implies as above a conical spring plate, 18 is a rod axially movable in the spindle and provided with a piston 14, which rod by means of a plate 5 acts on the spring 7. Oil under pressure is fed to the coupling body 16, through which the oil is led to a channel in the rotating piston shaft 2, which is connected to a cavity 15 on the other side of the piston. By changing the pressure acting on the piston the prestressing of the saw blade can be controlled. The coupling 16 can be of known type, where the steering bodies 17 prevent the coupling box from rotating but allow it to move in axial direction. It is, of course, provided with a rotating joint, the little oil leakage of the same can at the same time work as a lubrication and cooling medium of the coupling. At the periphery of the spindle 18 and the piston 14 there are O-tightening rings.

Figure 5:
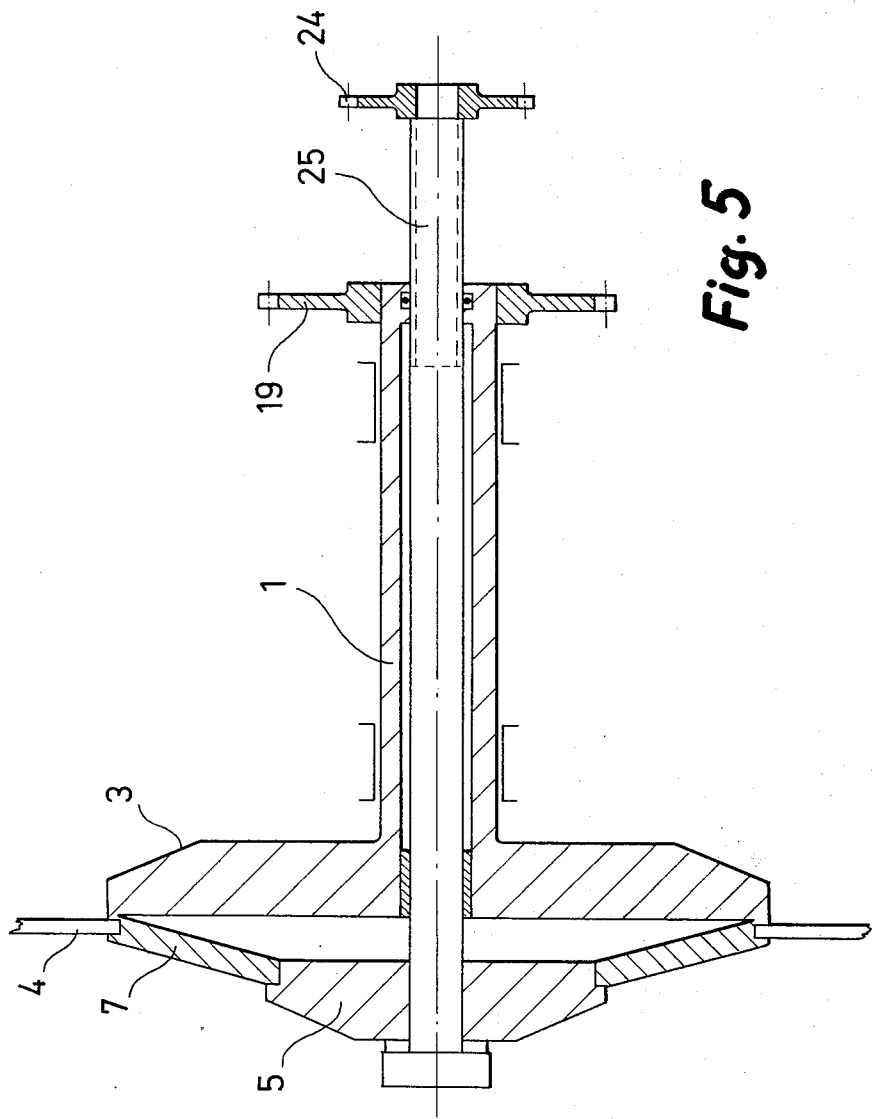
FIG. 5 shows a one-bladed circle saw, where the prestressing of the blade is mechanically controlled during operation.
Figure 6:
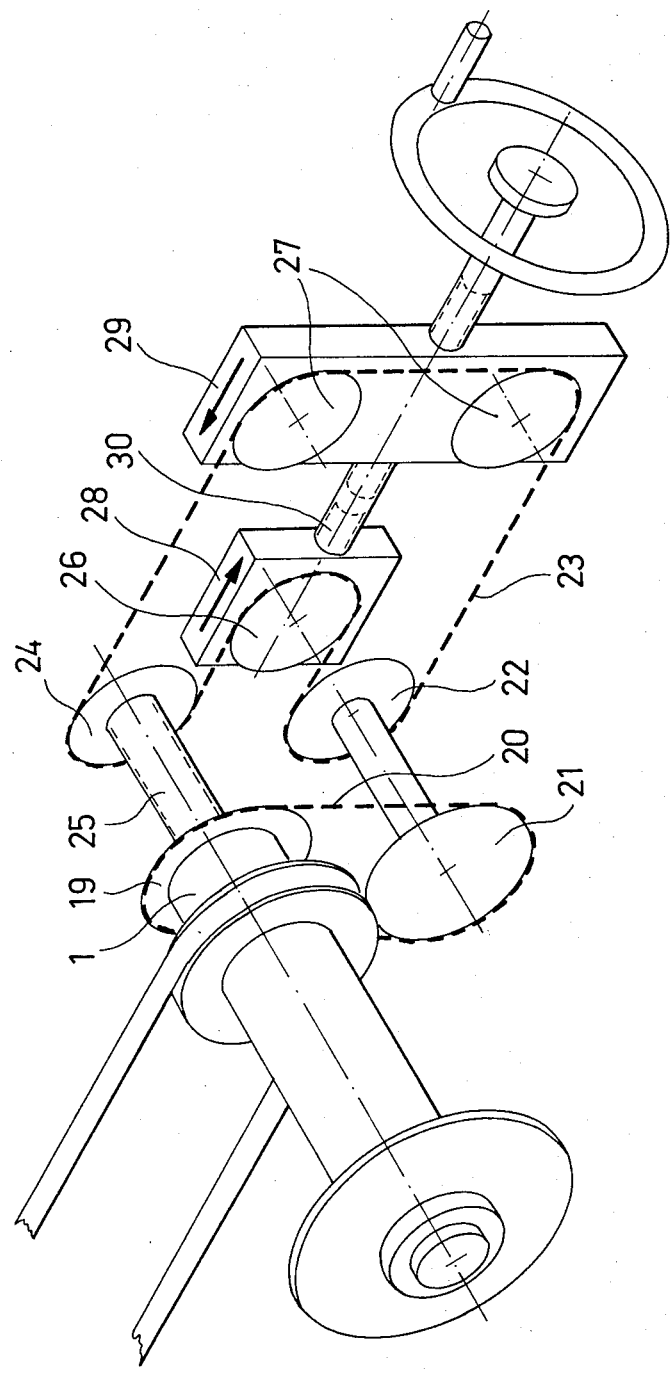
FIG. 6 shows the mechanical transmission device for the embodiment according to FIG. 5.

An alternative embodiment is presented in FIGS. 5 and 6, where the regulation of prestressing is carried out by a mechanic device. On the spindle 1 of the saw is mounted a sprocket wheel 19, which by means of a chain 20 is connected to a sprocket wheel 21 and to a sprocket wheel 22 mounted on the same shaft. A chain 23 connects the sprocket wheel 22 to a sprocket wheel 24, which is mounted on a shaft 25 fitted by means of a threaded transmission on the spindle 1. The chain 23 goes around wheels 26 and 27, which are mounted onto slide parts 28 respectively 29. These slide parts may be brought to slide against or away from each other by turning the spindle 20 which is threaded into them in opposite directions. This leads to that the sprocket wheel 24 turns in relation to the wheel 19, whereby the prestressing power of the saw blade changes.

The solutions represented in FIGS. 4–6 can naturally also be applied to circle saws with several blades.

What is claimed is:

1. Mechanism in a circle saw for fastening on to a saw shaft and prestressing of at least one saw blade, the blade being of the type having a hole in the middle of the blade, comprising:
   an axial body rotating with and carrying the blade and having an outer diameter which is substantially smaller than the diameter of the blade hole,
   a flexible member located between a rim of said axial body and the edge of the blade hole, said flexible member being expandable to a radial dimension larger than the distance between the blade hole edge and said rim in an unstressed condition of said blade by compression of said member in the axial direction,
   and supporting means supporting the blade from at least one side, and tightening means for compressing the flexible member in the axial direction to enlarge the flexible member radially, thus prestressing the blade, said tightening means comprising a lengthwise hole at the end of the saw shaft, a threaded smaller hole with a smaller cross-section in the bottom of said lengthwise hole, a socket shaped part slidable in the lengthwise hole, and means extending through the socket shaped part and turnable into the thread of said threaded smaller hole.

2. Mechanism according to claim 1, wherein the flexible member is a conical, ring shaped spring plate.

3. Mechanism according to claim 1 wherein the rotating body is an extension of the saw shaft and is provided with a threaded end, and wherein the tightening means includes a nut at the end of said extension.

4. Mechanism in a circle saw for fastening on to a saw shaft and prestressing of at least one saw blade, the blade being of the type having a hole in the middle of the blade, comprising
   an axial body rotating with and carrying the blade and having an outer diameter which is substantially smaller than the diameter of the blade hole,
   a flexible member located between a rim of said axial body and the edge of the blade hole, said flexible member being expandable to a radial dimension larger than the distance between the blade hole edge and said rim in an unstressed condition of said blade by compression of said member in the axial direction the flexible means being provided with a ring shaped notch receiving the edge of the blade hole,
   and supporting means supporting the blade from at least one side, and tightening means for compressing the flexible member in the axial direction to enlarge the flexible means radially, thus prestressing the blade.

* * * * *